United States Patent [19]

Higuchi et al.

[11] Patent Number: 5,534,740
[45] Date of Patent: Jul. 9, 1996

[54] ELECTROSTATIC ACTUATOR AND METHOD OF CONTROLLING THE SAME

[75] Inventors: Toshiro Higuchi, 14-1, Chigasakiminami 4-chome, Kouhoku-ku, Yokohama-shi, Kanagawa, 223, Japan; Saku Egawa; Toshiki Niino, both of Tokyo; Katsuhide Natori; Fumio Tabata, both of Kawasaki, all of Japan

[73] Assignees: Fujitsu Limited, Kawasaki; Toshiro Higuchi, Yokohama, both of Japan

[21] Appl. No.: 966,157

[22] PCT Filed: May 27, 1992

[86] PCT No.: PCT/JP92/00683

§ 371 Date: Jan. 27, 1993

§ 102(e) Date: Jan. 27, 1993

[87] PCT Pub. No.: WO92/22125

PCT Pub. Date: Dec. 10, 1992

[30] Foreign Application Priority Data

May 27, 1991 [JP] Japan ................... 3-121371

[51] Int. Cl.$^6$ .................................. H02N 1/00
[52] U.S. Cl. ............... 310/309; 310/68 B; 324/457
[58] Field of Search ............. 310/309, 12, 40 MM, 310/68 B, 17; 318/116; 324/661, 662, 669, 457

[56] References Cited

U.S. PATENT DOCUMENTS

| | | | |
|---|---|---|---|
| 4,061,043 | 12/1977 | Stiles | 310/309 |
| 4,754,185 | 6/1988 | Gabriel et al. | 310/309 |
| 4,814,657 | 3/1989 | Yano et al. | 310/309 |
| 5,043,043 | 8/1991 | Howe et al. | 156/645 |
| 5,055,731 | 10/1991 | Nihei et al. | 310/309 |
| 5,235,225 | 8/1993 | Colgate et al. | 310/309 |
| 5,378,954 | 1/1995 | Higuchi et al. | 310/309 |

FOREIGN PATENT DOCUMENTS

| | | |
|---|---|---|
| 0004764 | 10/1979 | European Pat. Off. . |
| 0265118 | 4/1988 | European Pat. Off. . |
| 63-095864 | 4/1988 | Japan . |
| 3095864 | 4/1988 | Japan . |
| 63-95862 | 4/1988 | Japan . |
| 63-136979 | 6/1988 | Japan . |
| 63-136980 | 6/1988 | Japan . |

OTHER PUBLICATIONS

Electrostatic Handbook, Society of Electrostatic Engineering, Publ. By Ohm–Sha, Japan, May 30 1956; Translation of pp. 653–675.
Higuchi et al., "Electrostatic Actuator Which Uses a Resistor as the Moving Body" 89th Meeting of Soc. of Electrical Engineering Report 737, Ehime Unn, of Matsuyama City, Kagawa–Ken, Japan; Mar. 10 1989; pp. 6–191 and 6–192.
Patent Abstract of Japan of Publ. No. JP22857978 Nov. 26 1990; "Electrostatic Actuator Using Film" by. H. Toshiro.
H. Kenjo et al. "Bluebacks B–909 Creation of Motors"; Mar. 20, 1992; Kodansha, pp. 246–250.
Database WPI, Week 8605, Derwent Publications Ltd., (List continued on next page.)

*Primary Examiner*—R. Skudy
*Attorney, Agent, or Firm*—Staas & Halsey

[57] ABSTRACT

An electrostatic actuator incorporates a sensor for detecting both position and the state of distribution of charges and is efficiently driven in high-speed operation. A first member has a plurality of driving electrodes thereon, each having the shape of a strip, a second member is placed in contact with the first member, and a control means is provided for changing the voltages applied to the driving electrodes to produce relative movement of the first member and the second member. Detecting electrodes are arranged on the first member at predetermined phases, independently of the driving electrodes, and a detecting unit detects the position of the second member and the state of charges induced on the second member, through the detection of electric signals induced in the detecting electrodes by the charges distributed on the second member.

17 Claims, 17 Drawing Sheets

OTHER PUBLICATIONS

London GB; AN 86–034458 & SU–A–1 167 546 (Moscow Lomonosov Univ) 15 Jul. 1985.

Patent Abstracts of Japan, vol. 12, No. 335 (E–656) 9 Sep. 1988 & JP–A–63 095864 (Canon) 26 Apr. 1988.

Egawa et al., "Film Actuators: Planar, Electrostatic Surface–Drive Actuators," IEEE Micro Electro Mechanical Systems, Nara 1991: Proceedings, Feb. 1991, New York, NY, pp. 9–14, XP295535.

B. Bollee, "Electrostatic Motors," Philips Technical Review, vol.30, No. 6/7, 1969, pp. 178–194.

Bart et al., "An Analysis of Electroquasistatic Induction Micromotors," Sensors and Actuators, vol. 20, Nos. 1/2, Nov. 15, 1989, Lausanne, CH, pp. 97–106.

Egawa et al., "Multi–Layered Electrostatic Film Actuator," IEEE Proceedings: Micro Electro Mechanical System, Feb. 11, 1990, Napa Valley, CA, pp. 166–171.

World Patents Index Latest, Week 8417, Derwent Publications Ltd., London, GB; AN 84105850 & SU–A–1 029 361 (Bushuev) Jul. 15, 1983.

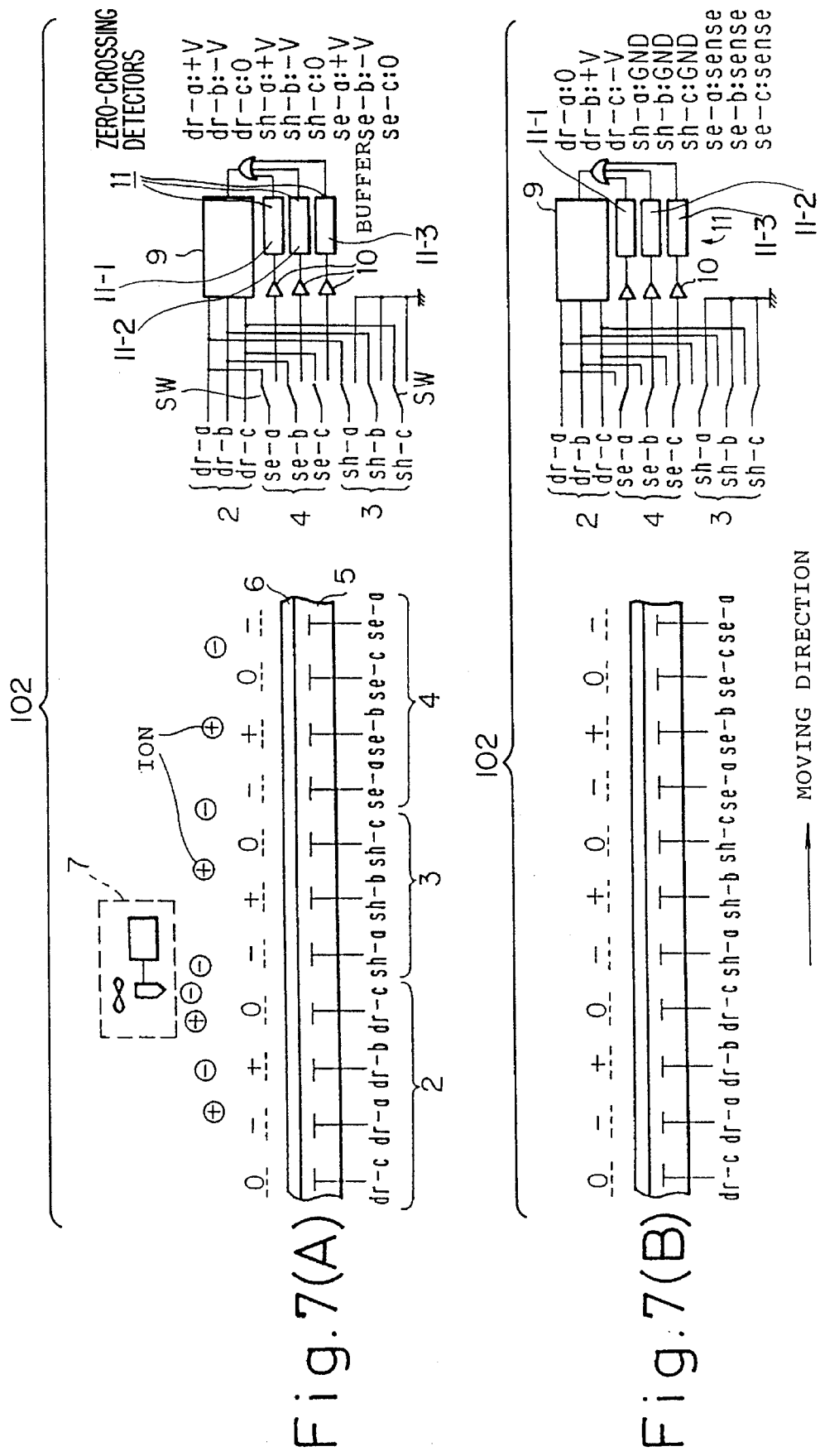

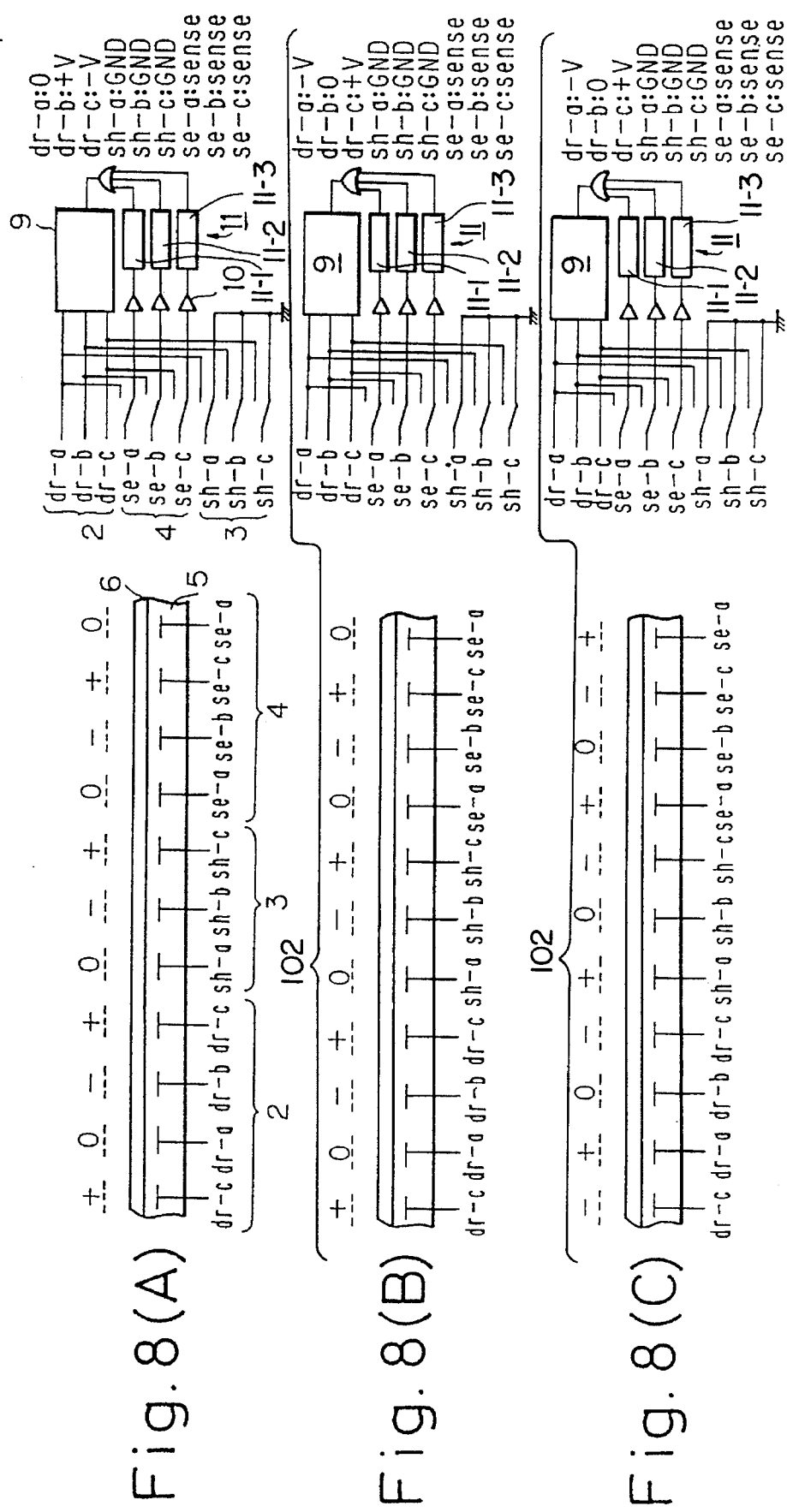

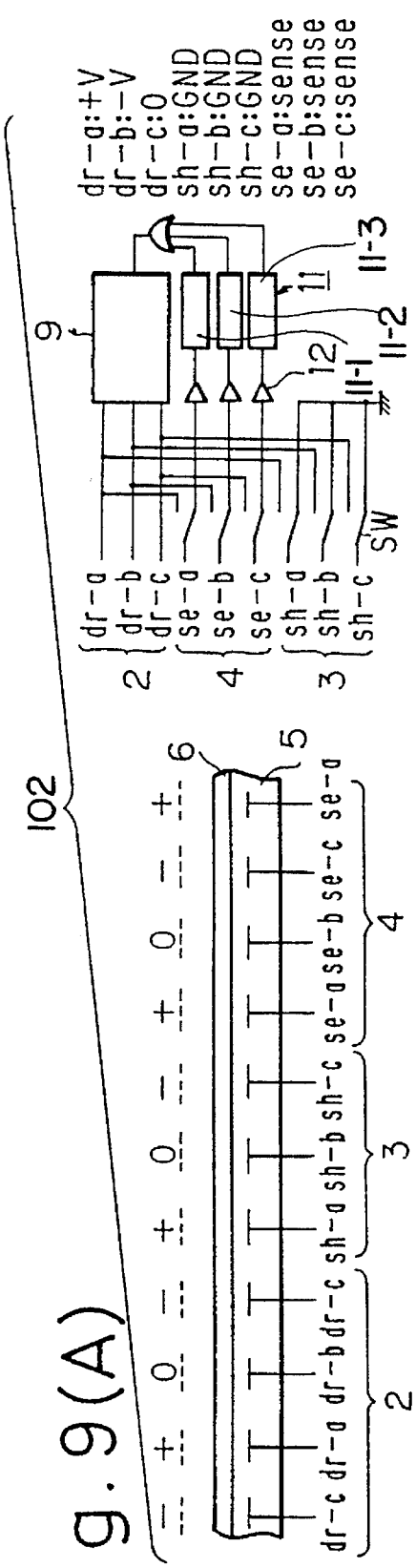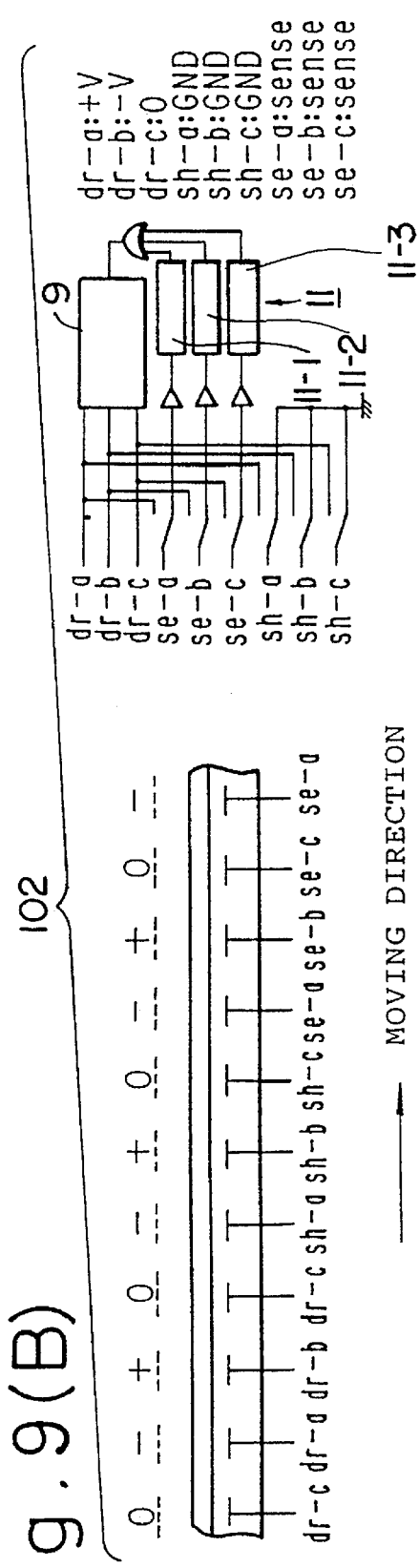

5,534,740

ELECTROSTATIC ACTUATOR AND METHOD OF CONTROLLING THE SAME

BACKGROUND OF THE INVENTION

The present invention relates to an electrostatic actuator powered by electrostatic power and, more specifically, to an electrostatic actuator capable of being efficiently controlled without adversely affecting the features thereof, and a method of controlling the electrostatic actuator.

DESCRIPTION OF THE PRIOR ART

Electrostatic generators have been generally known as devices for converting mechanical energy into electrostatic energy. The function of the electrostatic motor is the reverse of the electrostatic generator; that is, the electrostatic motor converts electrostatic energy into mechanical energy.

The electrostatic motor has a long history; studies of the electrostatic motor have been made since the eighteenth century. The electrostatic motor is described in detail, for example, in Seidenki Gakkai, "Seidenki Hando Bukku", Ohmu-sha, pp. 654–675. An induction motor utilizing a delay in the polarization of a dielectric is shown in this book. The principle of the induction motor is based on the fact that a dielectric is polarized when placed in an electric field, and the induction motor utilizes the delay in the polarization of the dielectric. That is, when a dielectric rotor is placed in a rotating electric field created in a stator, a dielectric load on the rotor is caused to lag behind the rotating electric field by the delay in polarization. The interaction between the charges of the rotor and the rotating electric field produces torque. Another type of motor employs a resistor instead of a dielectric. This motor uses a delay in charges induced in the resistor placed in a rotating electric field relative to the direction of the electric field.

The prior art electrostatic motor, however, has the following problems.

(a) The attraction between the resistor and the electrodes makes the use of a film resistor difficult.

(b) The electrostatic motor is a rotary structure comprising a stator and a rotor, and the stator and the rotor are disposed with a gap therebetween, and bearings and the like are used to maintain the gap. Accordingly, it is difficult to arrange the stator and the rotor with a small gap therebetween over a large area. Each of the stator and the rotor needs to have a sufficiently large thickness and a high rigidity to arrange the stator and the rotor with a small gap therebetween, which reduces the density of force, i.e., force produced per unit area.

Thus, it has been difficult to form the electrostatic motor in a compact construction and the density of force of the electrostatic motor is relatively small.

An electrostatic actuator solving the foregoing problems is proposed in, for example, "Electrostatic Actuator Employing a Moving Resistor" Denki Gakkai Zenkoku Taikai 1989 Koen Ronbun-shu, No. 737. This electrostatic actuator comprises a stator provided with a plurality of strip electrodes insulated from each other, a moving member disposed opposite to the stator, a charge pattern inducing device for inducing a charge pattern in the vicinity of the surface of the moving member according to a voltage pattern applied to the strip electrodes, accessories and a control unit for changing the voltage applied to the strip electrodes to drive the moving member.

A mechanism for generating a driving force by static electricity will be described in detail hereinafter with reference to FIGS. 3(A), 3(B) and 3(C) which illustrate a structure in accordance with the present invention. In general, however, the mechanism operates as follows.

When predetermined voltages are applied to the plurality of strip electrodes of a first member, such as a stator, charges are collected in portions of a second member disposed such as a moving member, opposite to the strip electrodes, by the electric fields created by the strip electrodes. Then, the moving member is attracted to the stator and held stably on the stator by a frictional force. Then, the voltages applied to the strip electrodes are changed to shift the voltage pattern and, consequently, charges of the same polarities as those of a position of the moving member are produced in the strip electrodes just opposite to the portion of the moving member, so that a repulsive force acts between the moving member and the strip electrodes to make the moving member float above the stator or to reduce the frictional force acting between the stator and the moving member. Since the respective polarities of the adjacent strip electrodes are opposite to each other, the moving member is moved horizontally by a distance substantially equal to the pitch of the strip electrodes by the attraction between the charges on a portion of the moving member and those on the strip electrodes, adjacent to one opposite to the portion, and then, the moving member is attracted again to the stator and held stably on the stator by the attraction between the charges collected thereon and the strip electrodes. The voltage pattern is shifted repeatedly thereby to shift the moving member continuously.

The driving speed of this electrostatic actuator is dependent mainly on a voltage pattern shifting period and, hence, the moving member driving speed is higher when the voltage pattern shifting period is shorter.

Since the prior art electrostatic actuator is controlled by an open-loop control system, the actual condition of the electrostatic actuator cannot be correctly known. Mechatronic technology, serving as a significant foundation of modern industries, is the integration of driving sources, detectors and control technology for controlling the driving sources and detectors, in which the detectors and control technology control the driving sources so as to make the most of the abilities of the driving sources. Actuators, when combined with neither detectors nor control means, are practically ineffective. Accordingly, it is essential to use the electrostatic actuator in combination with detectors and to control the electrostatic actuator by an appropriate control system to apply the electrostatic actuator effectively to practical uses.

Problems that arise in operating the electrostatic actuator at a high driving speed may be solved by mechatronics. As mentioned above, the driving speed of the electrostatic actuator can be enhanced by shortening the period for changing the voltages applied to the strip electrodes. However, the period cannot be shortened below the time required for the moving member to move by a distance corresponding to the pitch of the strip electrodes, because the movement of the moving member lags behind the shift of the voltage pattern and step-out, similar to that which occurs in stepping motors, occurs in the electrostatic actuator if the voltages are changed at a period shorter than the time required for the moving member to move by a distance corresponding to the pitch of the strip electrodes. Accordingly, it is possible to move the moving member at the highest possible speed by estimating the time required for the moving member to move by a distance corresponding to the pitch of the strip electrodes and changing the voltage pattern at a period corresponding to the estimated time. However, it is difficult to estimate the time required for the moving member to move by a distance corresponding to the pitch of the strip electrodes, because the time required for the moving member to move by a distance corresponding to the pitch of the strip electrodes is dependent on many factors, including the performance of complicated mechanisms. Such a problem may be solved by measuring the position of the moving member by a position sensor instead of measuring the time. However, a position sensor, in general, is expensive, adds an additional mass to the moving member and requires signal lines. Thus, the use of a position sensor adversely affects the forming of the electrostatic actuator with a lightweight construction, with a high density of force and at a low cost.

As mentioned above, charges are induced on the moving member of the electrostatic actuator and the moving member is driven by the interaction between the charges induced on the moving member and charges produced on the stator. Therefore, the distribution of the charges on the moving member will be gradually distorted while the moving member is driven for movement and, finally, no driving force will be produced if the induced charges are not firmly fixed on the moving member. Since the permanent fixation of the induced charges is difficult, charges must be induced again on the moving member when the distribution of the charges is distorted. Since recharging is possible, regardless of the position of the moving member, the moving member may be recharged when the distribution of the charges is completely distorted and no driving force is produced. However, it takes a long time to recharge the moving member in such a perfectly initial state. Therefore, if possible, the moving member is stopped so that a portion of the moving member, with the residual charges remaining, reaches a portion just over an adjacent electrode, before the distribution of charges is perfectly distorted and the positional control of the moving member becomes impossible, and then voltages are applied to the electrodes to replenish the moving member with charges and thereby to curtail the time required for recharging the moving member. However, excessively frequent recharging is a hindrance to driving the moving member. Therefore, the moving member must be recharged at appropriate times determined through observation of the charged condition of the moving member while the moving member is being driven. The charged condition can be observed by using a surface potentiometer. However, the surface potentiometer, similarly to the foregoing position sensor, is not necessarily suitable for use in combination with the electrostatic actuator.

SUMMARY OF THE INVENTION

Accordingly, it is an object of the present invention to provide an electrostatic actuator having a moving member and incorporating a sensing means capable of determining the position of the moving member and of detecting the distribution of charges on the moving member, without adversely affecting the features of the electrostatic actuator, and to provide a simple method of efficiently driving such an electrostatic actuator.

The present invention provides, to achieve the foregoing object, an electrostatic actuator comprising, as principal components, a first member provided with a plurality of strip electrodes insulated from each other, a second member placed in contact with the surface of the first member, and a control unit for changing the voltages applied to the strip electrodes to drive the second member in movement by an electrostatic force, wherein a single or a plurality of detecting electrodes is or are arranged, separately from the strip electrodes, in a predetermined positional phase, and a detector for detecting electric signals induced in the detecting electrode by the charges distributed on the second member thereby to determine the position of the second member and to detect the condition of the charges on the second member.

The present invention also provides a method of controlling such an electrostatic actuator, which drives the electrostatic actuator by using the electric signals induced in the detecting electrode or the detecting electrodes.

Since the electrostatic actuator of the present invention is provided with only the detecting electrode, or the detecting electrodes, formed on the first member as sensing means, the features of the electrostatic actuator, such as lightweight construction, high density of force and low cost, are hardly deteriorated.

The method of controlling an electrostatic actuator, of the present invention, processes the electric signals induced in the detecting electrode, or the detecting electrodes, directly and uses the processed electric signals as control information instead of converting the electric signals into positional information. Thus, the electrostatic actuator can be simply and efficiently controlled.

BRIEF DESCRIPTION OF THE DRAWINGS

FIGS. 7(A) and 7(B) are block diagrams for assistance in explaining a procedure of driving the electrostatic actuator of the second embodiment;

FIGS. 8(A), 8(B) and 8(C) are block diagrams for assistance in explaining a procedure of driving the electrostatic actuator of the second embodiment;

FIGS. 9(A) and 9(B) are block diagrams for assistance in explaining a procedure of driving the electrostatic actuator of the second embodiment;

DETAILED DESCRIPTION OF THE PREFERRED EMBODIMENTS

Preferred embodiments of the present invention will be described hereinafter with reference to the accompanying drawings.

Figure 1:
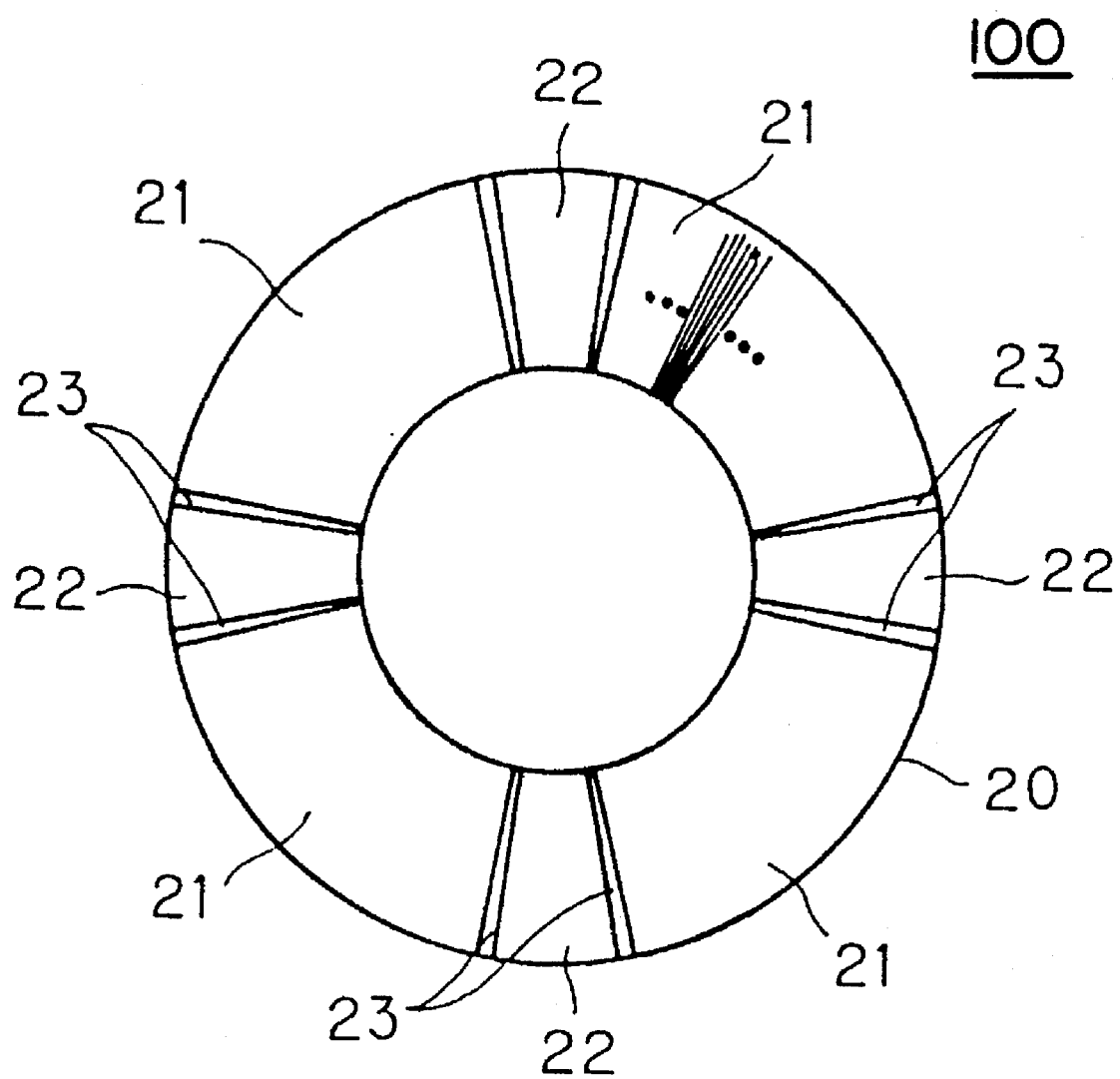
FIG. 1 is a top plan view of an electrostatic actuator of a first embodiment according to the present invention.
Figure 2:
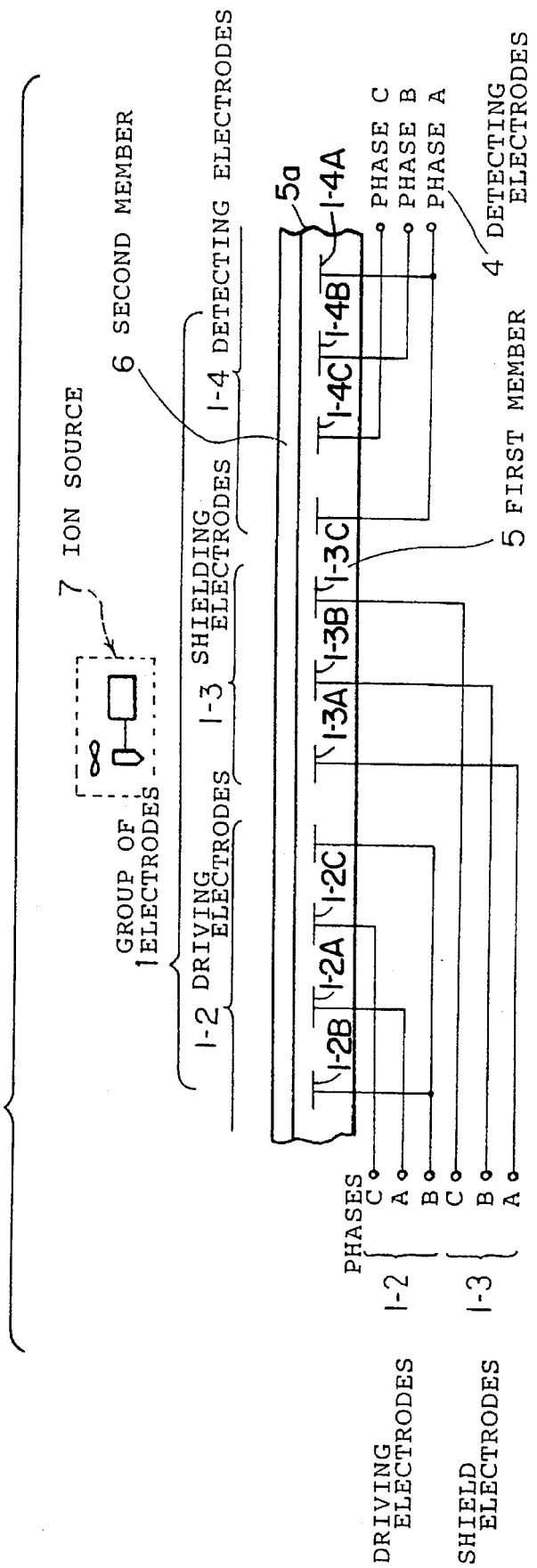
FIG. 2 is a sectional view of an electrostatic actuator in accordance with the present invention.

FIGS. 1 and 2 are a top plan view and a sectional view, respectively, of an electrostatic actuator 100 in a first embodiment according to the present invention. As shown in FIG. 2, a first member 5 comprises an insulating plate having strip electrodes 1 buried in or on the surface of the insulating plate in a radial arrangement. The strip electrodes 1 are divided into three groups, i.e., a group of driving electrodes 2, a group of shielding electrodes 3 and a group of detecting electrodes 4. The strip electrodes 1 of each group further are divided into three phases A, B and C. As shown in FIG. 2 by way of example, 1440 strip electrodes are divided into 1128 driving electrodes 1-2, 24 shielding electrodes 1-3 and 228 detecting electrodes 1-4 each effective electrode portion has an inside diameter of 50 mm and an outside diameter of 100 mm.

A second member 6 placed on top of the first member 5 is, for example, an insulating PET film of 25 μm in thickness. An ion source 7, i.e., an additional device, for inducing charges on the second member is disposed above the second member 6.

The principle on which the electrostatic actuator 100 is driven will be described with reference to FIGS. 3(A), 3(B) and 3(C) and the principle on which a sensor, which is incorporated into the electrostatic actuator, functions will be described in connection with that principle.

Figure 3A:
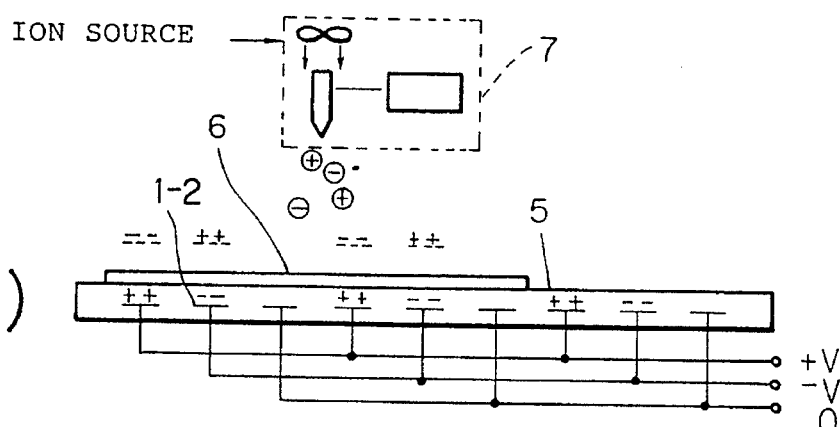
FIGS. 3(A), 3(B) and 3(C) are schematic sectional views for assistance in explaining the principle on which the electrostatic actuator is driven.

The ion source 7 is operated and voltages are applied to the driving electrodes 1-2A, 1-2B and 1-2C of three different phases as shown in FIG. 3(A). Then, groups of ions of respective polarities opposite to those of the driving electrodes 1-2A, 1-2B and 1-2C are attracted by the driving electrodes 1-2A, 1-2B and 1-2C, and corresponding groups of charges having those respective different poralities are induced on the surface of the second member 6, as shown in FIGS. 3(A).

Figure 3B:
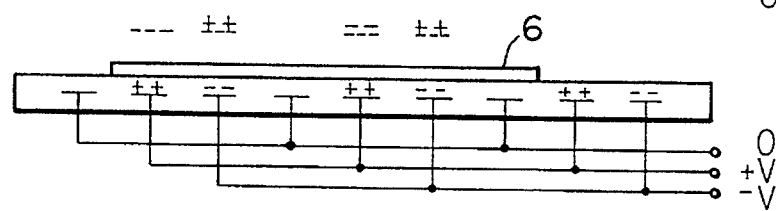

After the groups of charges have thus settled on the surface of the second member 6, the ion source 7 is stopped, and then the voltage pattern is shifted in the right direction by a distance corresponding to the pitch of the driving electrodes 2, as shown in FIG. 3(B). Consequently, the polarities of the groups of charges on the driving electrodes 1-2 change instantaneously, whereas the respective polarities of the charges on the second member 6, i.e., the insulating film, remains unchanged because the ion source 7 is stopped.

Figure 3C:
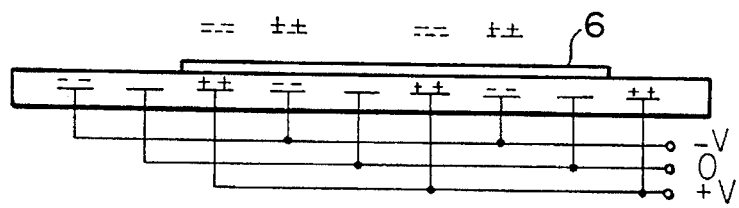

Thus, a raising force and a driving force, i.e., an upward force and a rightward force, as viewed in FIGS. 3(A) to 3(C) act on the second member 6, to shift the same by a distance corresponding to the pitch of the driving electrodes 1-2. The voltage pattern is shifted continually, thereby to drive the second member 6 in continuous movement.

Figure 4A:
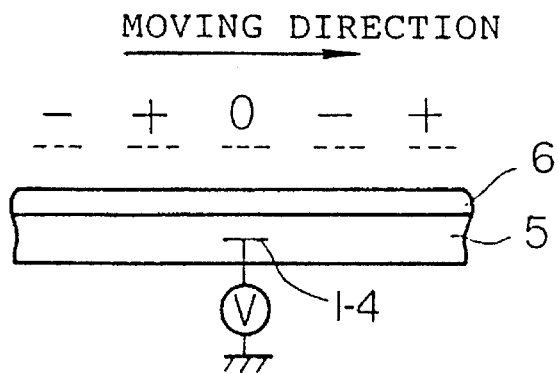
FIGS. 4(A), 4(B), 4(C) and 4(D) are diagrammatic views and a graph for assistance in explaining the principle on which a sensor incorporated into an electrostatic actuator is based.
Figure 4B:
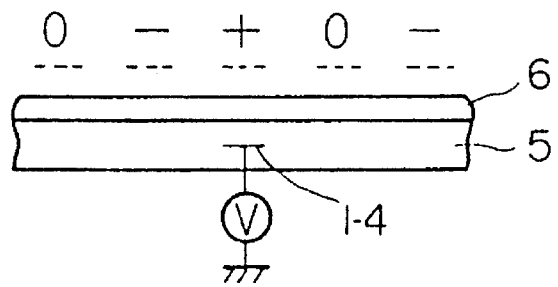
Figure 4C:
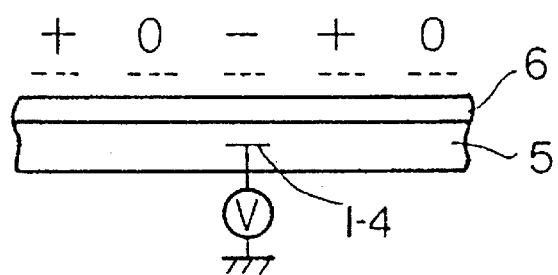

The present invention applies the following principle of detection, to detect the position of the moving member 6 of the electrostatic actuator 100 driven on the foregoing principle. When the second member 6, charged in a state, as shown in FIGS. 3(A) to 3(C), moves, a neutral section (0-section), a positively charged section (+-section) and a negatively charged section (−-section) pass each strip (e.g., detecting) electrode 1-4 of the first member 5 sequentially as shown in FIGS. 4(A) to 4(C).

When a detecting electrode 1-4 is provided, the potential of a detecting electrode 1-4, to which no voltage is applied, is dependent on the electrical condition of the associated section of the second member 6 corresponding to the detecting electrode 1-4; that is, the potential of the detecting electrode 1-4 is dependent on the relative position of the moving member, provided that the distribution of charges on the second member 6 is fixed. Therefore, the potential of the detecting electrode 4 can be used as a source of positional information representing the position of the second member 6, i.e., the moving member, relative to the first member 5.

Figure 4D:
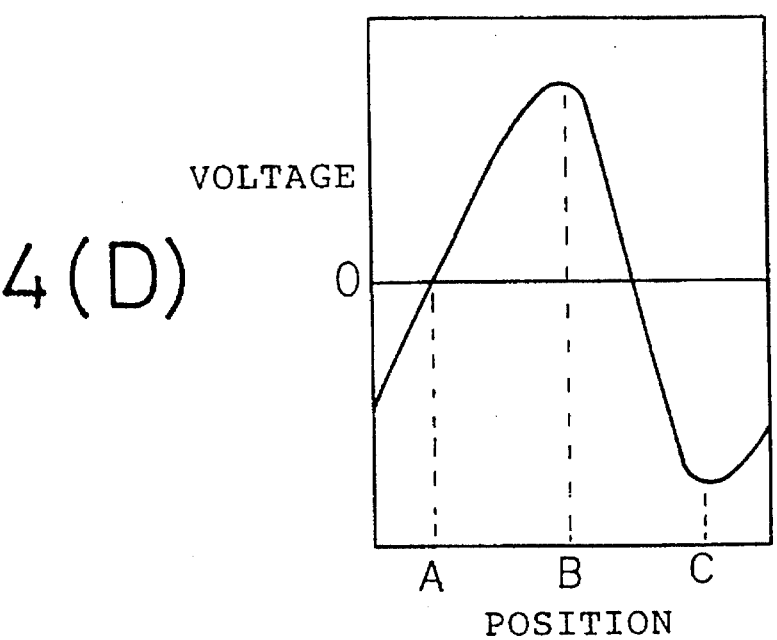

In this embodiment, some of the strip electrodes 1 arranged in a radial arrangement are used as the detecting electrode 1-4, and the detecting electrodes 1-4 are also divided into three phases A, B, and C as shown in FIG. 2. When the 0-section, the potential of which is zero, is in the vicinity of the detecting electrode 1-4, as shown in FIG. 4(A), the potential of the detecting electrode 1-4 varies regularly, or suprachronously, with the movement of the second member 6 as shown in FIG. 4(D). When the +-section or the −-section of the second member 6 is in the vicinity of the detecting electrode 1-4 as shown in FIG. 4(B) or 4(C), the potential of the detecting electrode 1-4 varies through a local maximum or a local minimum as shown in FIG. 4(D) and hence the relation between the displacement of the second member 6 and the potential of the detecting electrode 1-4 is not in a one-to-one correspondence. Therefore, a logical processing operation is necessary to determine the displacement of the moving member from the potential of a single detecting electrode, for overall sections of the first and second members. Note that since the detecting electrodes 1-4 are connected respectively to three phases A, B and C and the 0-section of the second member 6 is necessarily in the vicinity of the detecting electrode 1-4 of one of the three phases A to C, the position of the second member 6 can readily be determined by using the potential of the detecting electrode 1-4 having a phase corresponding to the 0-section of the second member 6.

Since the potential of the detecting electrode 1-4 is induced by the charges on the second member 6, the absolute value of the potential of the detecting electrode 1-4 decreases when the quantity of charges on the second member 6 decreases as the second member 6 is driven in movement. Although the potential of the detecting electrode 1-4 is not in direct correspondence with the position of the second member 6, the position of the second member 6 at an optional (i.e., at any arbitrary) time can be detected by measuring the amplitude of the variable potential of the detecting electrode 1-4, for example, +, −, 0, during the movement of the second member 6 and normalizing the potential so that the amplitude thereof is "1". The amplitude may be in a one-to-one correspondence with the quantity of charges induced on the second member 6.

Figure 5:
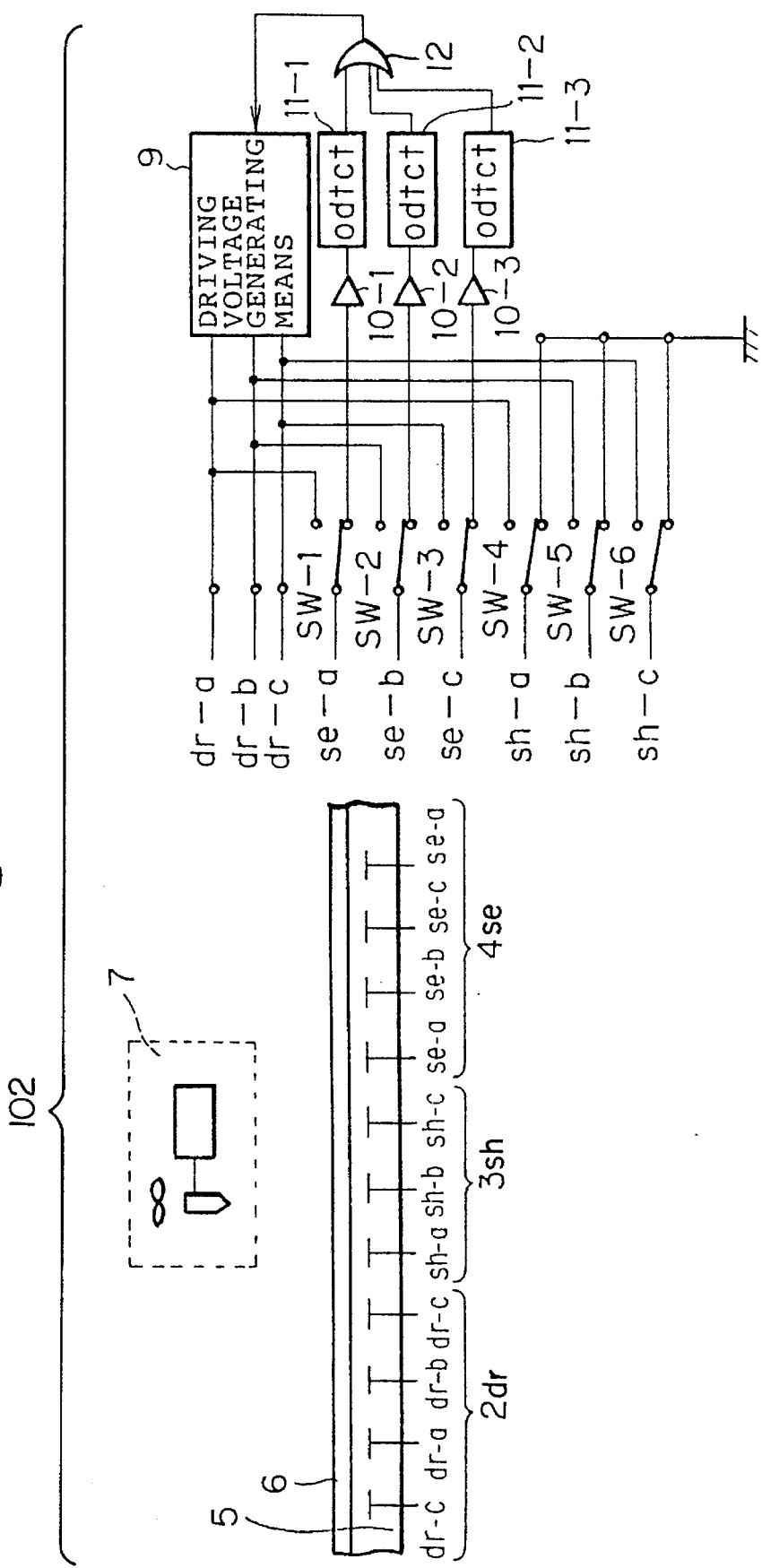
FIG. 5 is a block diagram of an electrostatic actuator of a second embodiment according to the present invention.
Figure 6A:
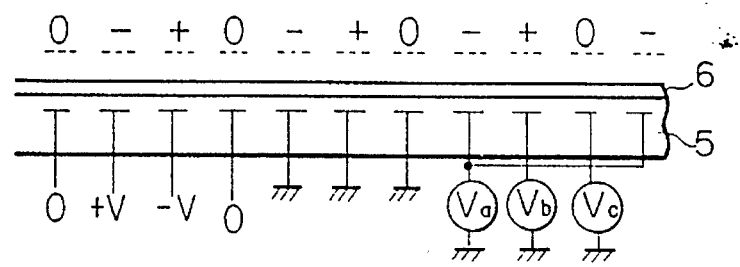
FIGS. 6(A), 6(B), 6(C) and 6(D) are diagrammatic views and a graph for assistance in explaining the variation of voltage, that appears at a detecting electrode, as the second member of an electrostatic actuator moves.
Figure 6B:
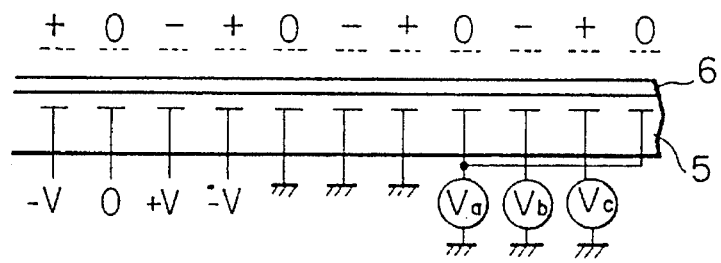
Figure 6C:
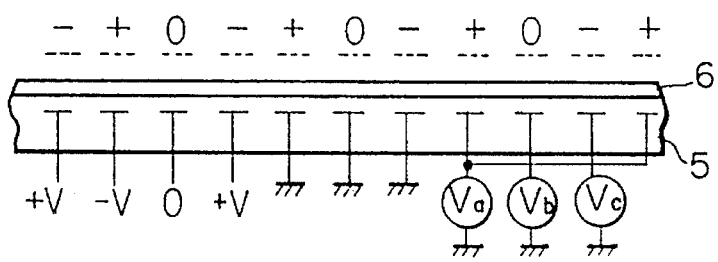
Figure 6D:
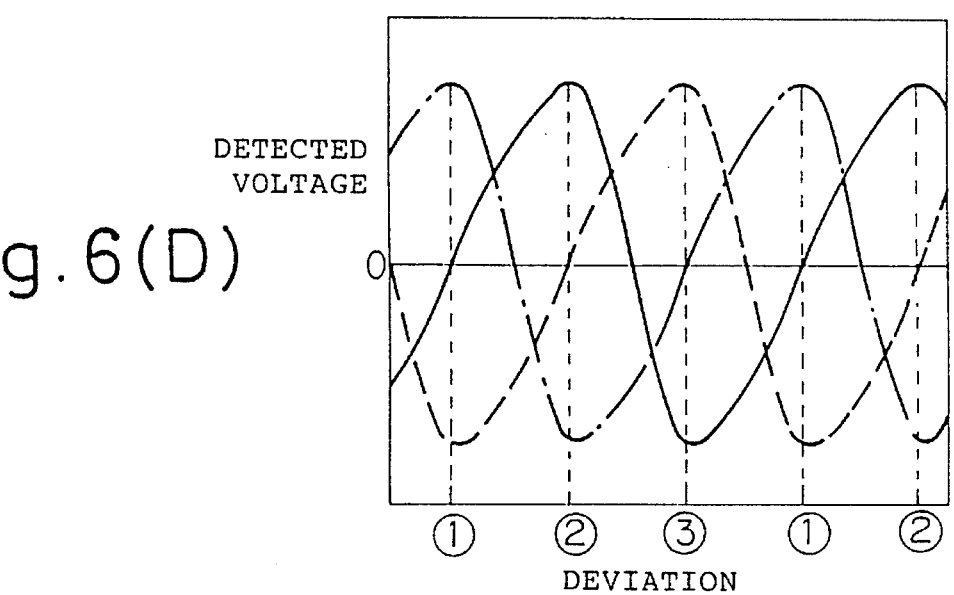

FIG. 5 shows a driving system for driving an electrostatic actuator 102 of a second embodiment according to the present invention for high-speed operation. This electrostatic actuator has a first member 5, a second member 6 and an ion source 7, which are identical with those employed in the first embodiment. Driving electrodes 2dr of three phases, i.e., driving electrodes dr-a, dr-b and dr-c, are connected to a driving voltage generator 9. Detecting electrodes 4se of three different phases, i.e., phases se-a, se-b and se-c, are connected selectively either to the driving voltage generator 9 or to the buffer amplifiers 10 (10-1, 10-2 and 10-3) through switches SW-1, SW-2 and SW-3, respectively.

Signals amplified by the buffer amplifiers 10 are applied to zero crossing detectors ("odtct") 11 (11-1, 11-2 and 11-3) connected through OR-gate 12 to the driving voltage generator 9. The shielding electrodes 3sh of three phases (sh-a, sh-b and sh-c), arranged between the group of the driving electrodes 2 and the group of the detecting electrodes 4, are connected selectively to the driving voltage generator 9 or to ground by switches SW-4, SW-5 and SW-6, respectively.

The operation of the driving system for driving the electrostatic actuator at high driving speed will be described hereinafter. Voltages applied to the driving electrodes 2 of the electrostatic actuator are changed, thereby to shift the voltage pattern so as to move the second member 6, stepwise, in a driving direction. Since the time for which the second member 6 remains stationary after each shifting step is useless, the voltages are changed at a high frequency so that the second member 6 is driven at a high driving speed so as to curtail the time during which the second member 6 remains stationary.

However, if the voltages are changed at an excessively high frequency and the voltages are changed for the next voltage changing cycle before the second member 6 moves by one step, the second member 6 is unable to follow the shift of the voltage pattern and a step-out of the electrostatic actuator occurs. The present invention employs the detecting electrodes 4 for detecting the movement of the second member 6 by one step and shifts the voltage pattern in synchronism with the detection of movement of the second member 6 by one step, thereby to prevent the step-out and to curtail the useless time during which the second member 6 remains stationary.

Generally, the movement of the second member 6 by one step is detected from information provided by a position sensor. However, only information indicating the period when the movement of the second member 6 by one step is completed is necessary for the high-speed driving of the electrostatic actuator and no information correctly indicating the position of the second member 6 is necessary. The employment of a known position sensor requires a complicated device and algorithm.

Accordingly, the driving system of the present invention detects the completion of movement of the second member 6 by one step by a simple method, which will be described hereinafter. As mentioned in the description of the first embodiment, when the second member 6 of the actuator 100 on which charges are induced, as shown in FIGS. 3(A) to 3(C), moves along the surface of the first member 5, the 0-section, the +-section and the −-section sequentially move past and over each detecting electrode 1-4. Since the phase of the detecting electrode 1-4 is the same as the driving electrode 2, the 0-section is located directly above one of the detecting electrodes 1-4 having a phase, as shown in FIGS. 6(A) to 6(D), and the potential of the detecting electrodes having the same phase becomes zero.

The potential of each phase becomes zero twice, namely, a first case where the 0-section is located directly above the detecting electrode 4se of a phase and a second case where the middle point between the +-section and the −-section comes to the portion above the detecting electrode 4se of the phase. However, the first case and the second case can be readily discriminated because the direction of approach of the potential to zero in the first case and that in the second case are different from each other. The present invention monitors the respective potentials of the detecting electrodes 4se of the phases, and decides that the second member 6 has completed its movement by one step when the potential of one of the detecting electrodes 4 changes past zero in a predetermined direction. After that, a switching operation for changing the driving voltage is carried out.

The procedure of high-speed driving of the electrostatic actuator will be described next with reference to FIGS. 7(A) and 7(B).

First, the detecting electrodes 4se and the shielding electrodes 3sh are connected to the driving voltage generator 9, voltages are applied respectively to the driving electrodes 2dr, the detecting electrodes 4se and the shielding electrodes 4se, and then the ion source 7 is started. Ions are attracted to sections of the second member 6 corresponding to those electrodes and groups of charges are settled in the sections as shown in FIG. 7(A). Then, the detecting electrodes 4se of the phases se-a, se-b and se-c are connected to the corresponding buffer amplifiers 10, the shielding electrodes 3sh are grounded, and then the voltage pattern of the voltages applied to the driving electrodes 2dr is shifted to the right as viewed in FIG. 7(A) so that voltages are applied in a voltage pattern as shown in FIG. 7(B).

Then, the second member 6 is shifted to the right, a 0-section in the second member 6 approaches the detecting electrode 4 of the phase se-a, and the potential of the phase se-a crosses the potential level of 0 from a negative value to a positive value upon the completion of the movement of the second member 6 by one step. The zero crossing detector 11-1 detects the change of the potential of the phase se-a from a negative value to a positive value (FIG. 8(A)), and then the zero crossing detector 11-1 gives a signal to the driving voltage generator 9 to shift the voltage pattern again to the right (FIG. 8(B)). Consequently, the second member 6 is shifted again to the right and the potential of the detecting electrode 4 of the phase se-b changes across zero. The zero crossing detector 11-2 detects the change of the potential of the detecting electrode 4 of the phase se-b across zero (FIG. 8(B)), and then the voltage pattern is shifted to the right (FIG. 9(A)). Next, the second member 6 is further shifted to the right and the potential of the detecting electrode 4 of the phase se-c changes across zero. Then, the zero crossing detector 11-3 detects change thereof (FIG. 9(B)), and the voltage pattern is again shifted to the right. After that, steps shown in FIGS. 8(A) through 9(B) are repeated.

Figure 10:
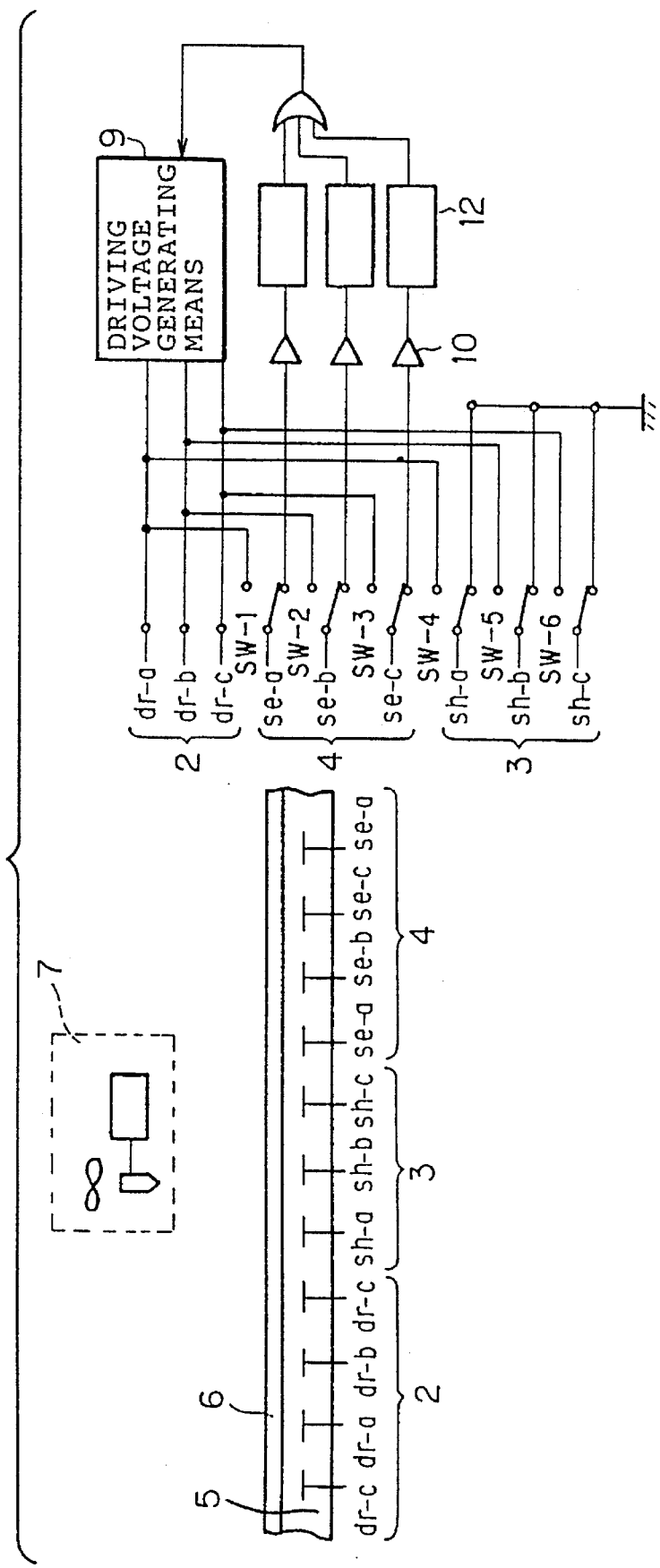
FIG. 10 is a block diagram of a driving system for driving an electrostatic actuator of a third embodiment according to the present invention.

FIG. 10 shows a driving system for driving an electrostatic actuator (104) in a third embodiment according to the present invention. This electrostatic actuator has a first member 5 and a second member 6, which are identical to those employed in the first embodiment. Detecting electrodes 4 having three phases se-a, se-b and se-c are connected selectively to either a driving voltage generator 9 or buffer amplifiers 10 by switches SW-1, SW-2 and SW-3, respectively. The respective outputs of the buffer amplifiers 10 are given to extremum detectors 12 connected to the driving voltage generator 9.

Shielding electrodes 3, arranged between a group of driving electrodes 2 and a group of detecting electrodes 4, are connected selectively to either a driving voltage generator 9 or to ground by switches SW-4, SW-5 and SW-6, respectively. A procedure of high-speed driving of the electrostatic actuator by the driving system will be described hereinafter. The driving system, similarly to the driving system in the second embodiment, detects the completion of movement of the second member 6 by one step, thereby and changes the driving voltages upon the detection of completion of movement of the second member 6 by one step to drive the electrostatic actuator at a high driving speed. However, the method of detecting the completion of movement of the second member 6 by one step, employed in the third embodiment, is different from that employed in the second embodiment.

As stated above, 0-sections, +-sections and −-sections pass over the detecting electrodes 4 when the second member 6 of the electrostatic actuator, charged in a state as shown in FIG. 3(A), moves along the surface of the first member 5. Since the detecting electrodes 4 and the driving electrodes 2 are arranged in positions such that the phases of both thereof are identical to each other, the +-section or the −-section of the second member 6 is located directly above the detecting electrode 4 of one of the phases se-a, se-b and se-c at the completion of movement of the second member 6 by one step and the potential of the detecting electrode 4 of the phase reaches an extremum (i.e., a maximum, or a peak). The driving system monitors the respective potentials of the detecting electrodes 4, decides that the movement of the second member 6 by one step has been completed, upon the coincidence of the potential of one of the detecting electrodes with an extremum, and then changes the driving voltages in synchronism with the completion of movement of the second member 6 by one step.

Figures 11A, 11B:
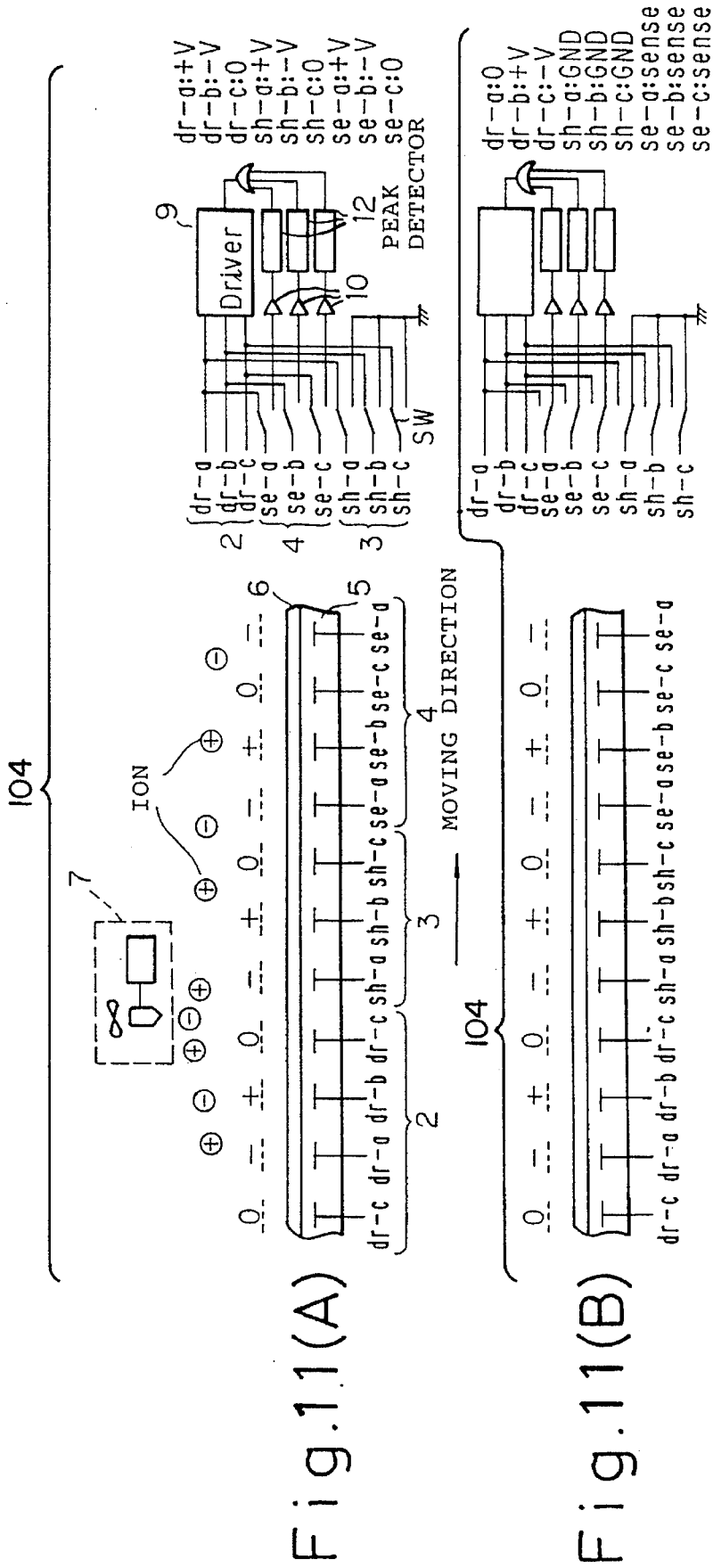
FIGS. 11(A) and 11(B) are block diagrams for assistance in explaining a procedure of driving the electrostatic actuator of the third embodiment.
Figure 12A:
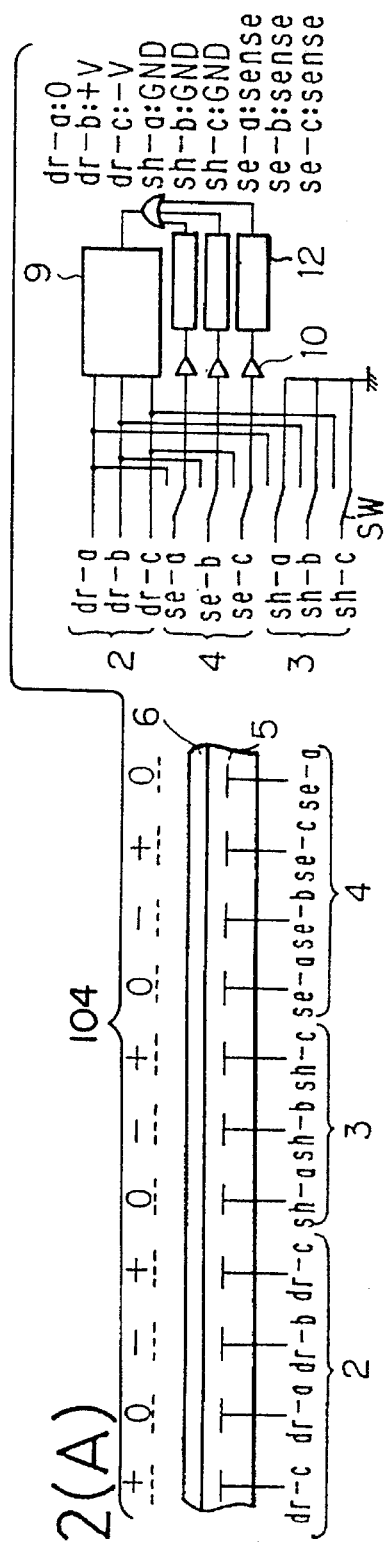
FIGS. 12(A), 12(B) and 12(C) are block diagrams for assistance in explaining a procedure of driving the electrostatic actuator of the third embodiment.
Figure 12B:
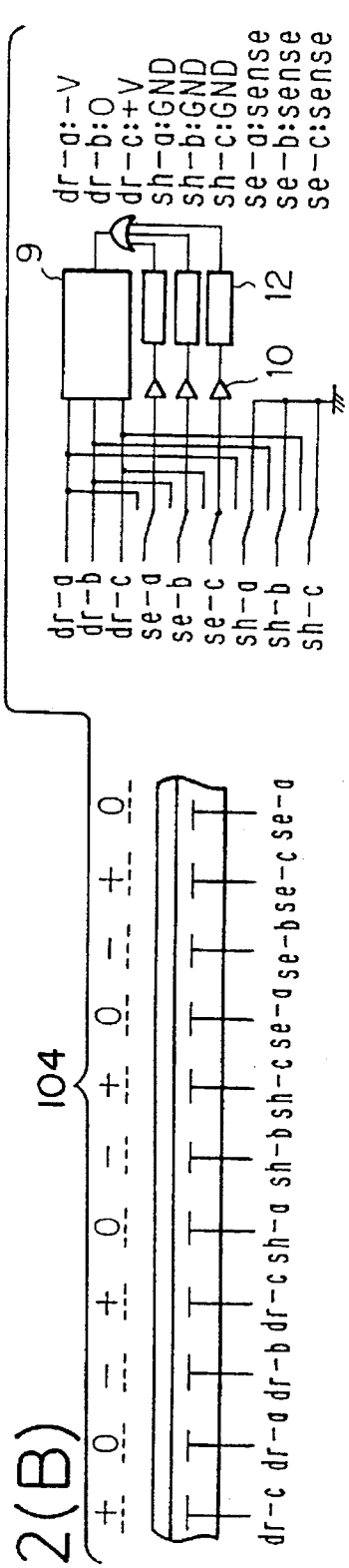
Figure 12C:
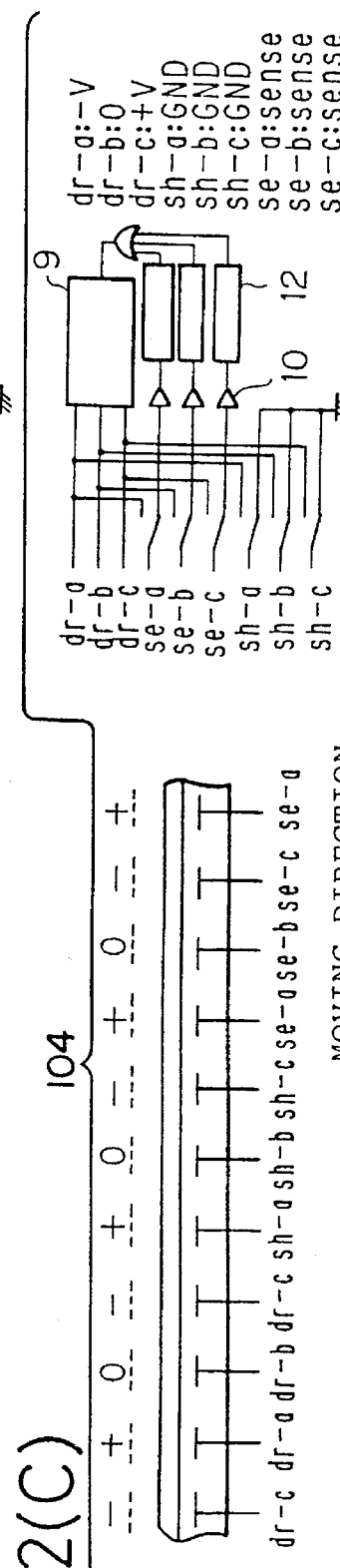
Figure 13A:
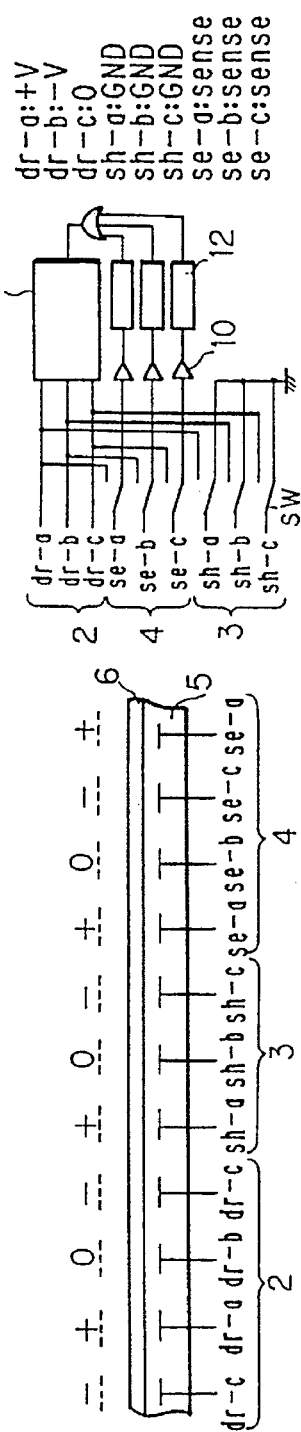
FIGS. 13(A) and 13(B) are block diagrams for assistance in explaining a procedure of driving the electrostatic actuator of the third embodiment.
Figure 13B:
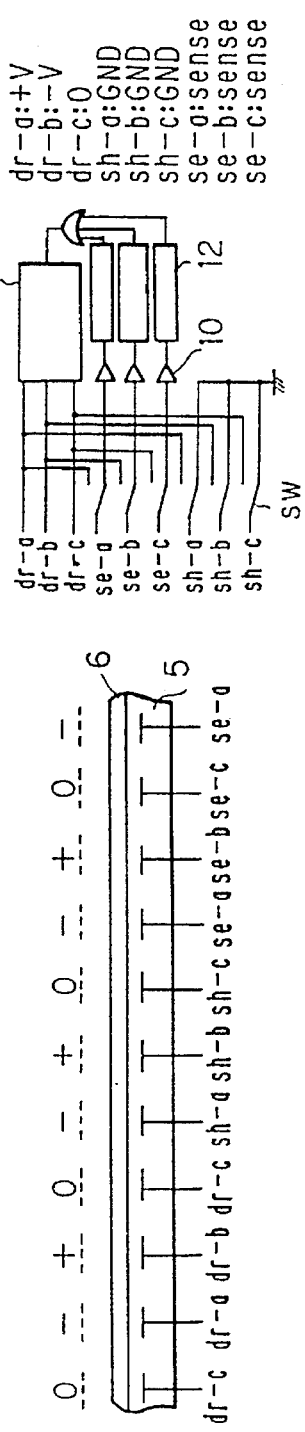

The procedure of high-speed driving of the electrostatic actuator will be described with reference to FIGS. 11(A) through 13(B). First, the detecting electrodes 4 and the shielding electrodes 3 are connected to the driving voltage generator 9, voltages are applied respectively to the driving electrodes 2, the detecting electrodes 4 and the shielding electrodes 3, and then the ion source 7 is started. Then, ions are attracted to sections of the second member 6 corresponding to those electrodes and charges are settled in the sections as shown in FIG. 11(A). Then, the detecting electrodes 4 are connected to the buffer amplifiers 10, the shielding electrodes 3 are grounded and the voltage pattern of the voltages applied to the driving electrodes 2 is shifted to the right as viewed in FIG. 11(B), so that voltages are applied to the driving electrodes 2 in a voltage pattern as shown in FIG. 11(B).

As the second member 6 moves to the right, the +-section of the second member 6 approaches the detecting electrode 4 of the phase se-c. Upon the completion of the movement of the second member 6 by one step, the potential of the detecting electrode 4 of the phase se-c reaches a maximum. The extremum detector 12 detects the coincidence of the potential of the detecting electrode of the phase se-c with the maximum (FIG. 12(A)) and gives a signal to the driving voltage generator 9 to shift the voltage pattern to the right again (FIG. 12(B)). Then, the second member 6 is moved to the right and the potential of the detecting electrode 4 of the phase se-a reaches a maximum. The extremum detector 12 detects the coincidence of the potential of the detecting electrode 4 of the phase se-a with the maximum (FIG. 12(C)), and then the voltage pattern is shifted to the right (FIG. 13(A)). Then, the second member 6 moves to the right and the detecting electrode 4 of the phase se-b reaches a maximum, the extremum detector 12 detects the coincidence of the potential of the detecting electrode 4 of the phase se-b with the maximum (FIG. 13(B)), and then the voltage pattern is shifted to the right. After than, steps shown in FIGS. 11(A) through 13(B) are repeated.

Figure 14:
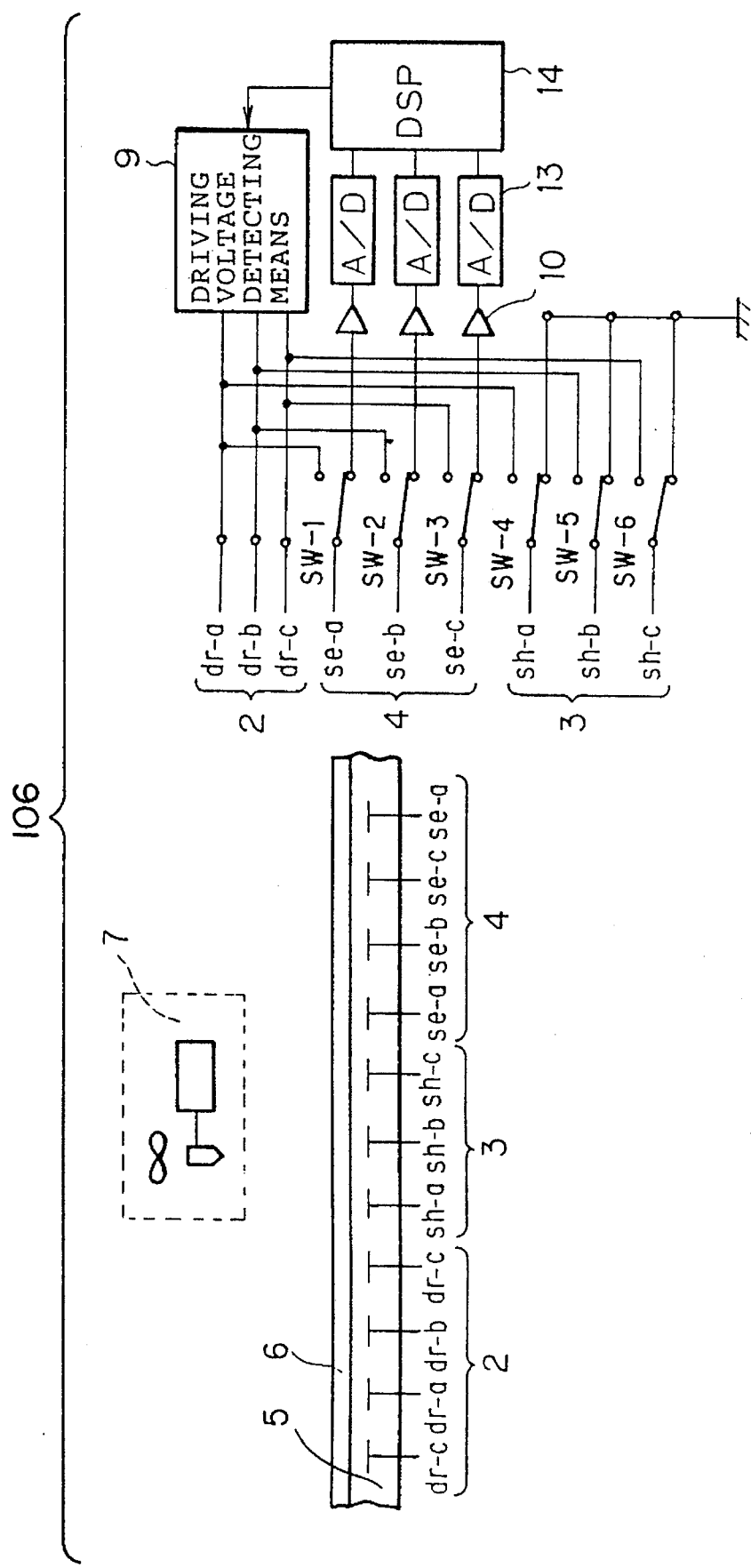
FIG. 14 is a block diagram of an electrostatic actuator of a fourth embodiment according to the present invention.

FIG. 14 shows a driving system (106) for driving an electrostatic actuator in a fourth embodiment: according to the present invention at a high driving speed. The electrostatic actuator has a first member 5, a second member 6 and an ion source 7, which are identical with those of the first embodiment. Detecting electrodes 4 of three phases are connected respectively to the input terminals of buffer amplifiers 10.

The output terminals of the buffer amplifiers 10 are connected respectively to the respective input terminals of A/D converters 13. The outputs of the A/D converters are applied to a digital signal processor (DSP) 14. The DSP 14 processes the input signals and gives a voltage change instruction signal to a driving voltage generator 9. The operation of the DSP 14 includes, for example, the elimination of systematic errors in the potentials of the detecting electrodes 4 and the advancement of the driving voltage changing timing to cancel a delay in feedback.

Figure 15:
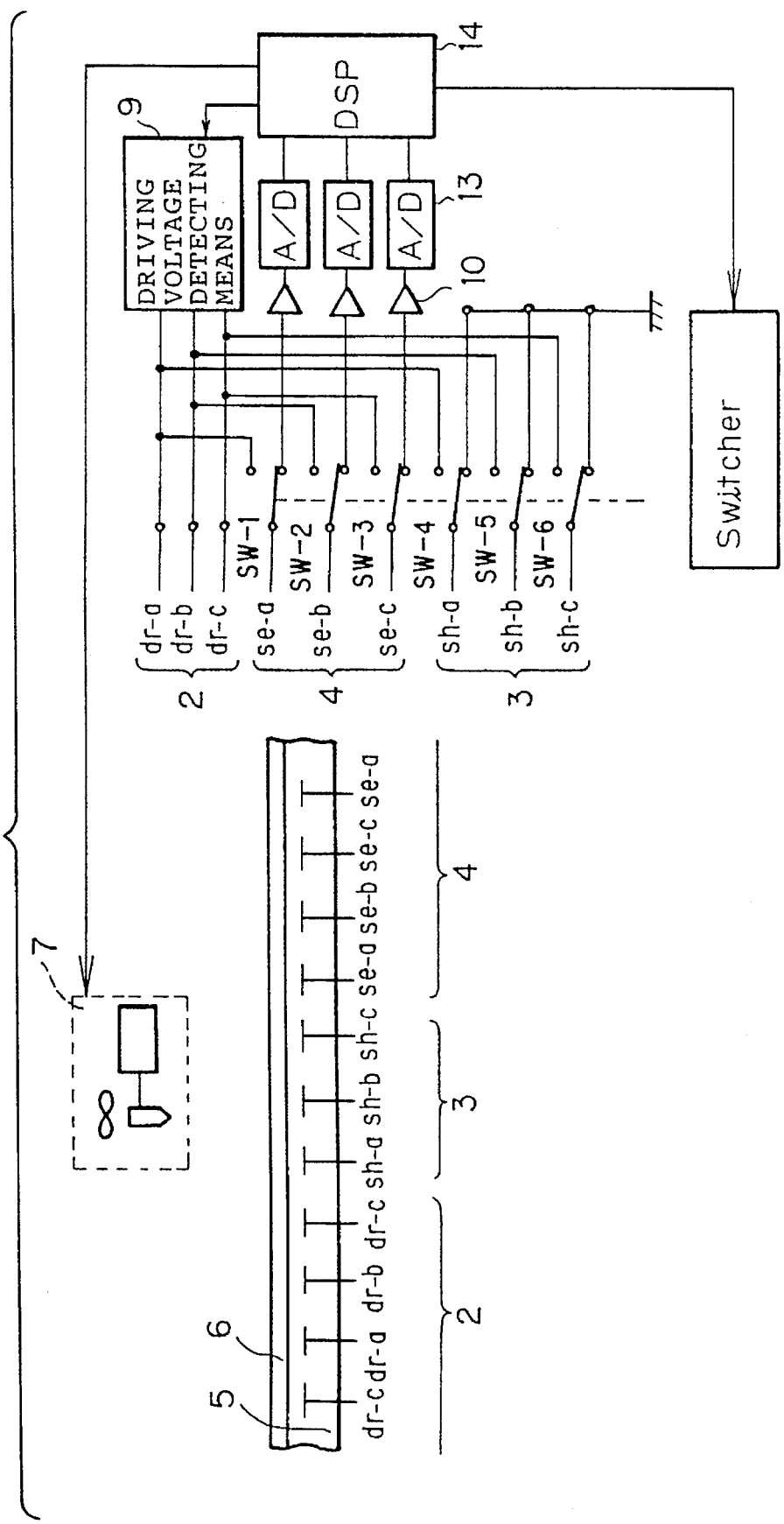
FIG. 15 is a block diagram of an electrostatic actuator of a fifth embodiment according to the present invention.

FIG. 15 shows a driving system (108) for driving an electrostatic actuator in a fifth embodiment according to the present invention, capable of efficiently recharging a second member 6 utilizing a certain sensor included in the electrostatic actuator. The electrostatic actuator will be described hereinafter with reference to FIGS. 15 through 17(B). The electrostatic actuator has a first member 5, the second member 6 and an ion source 7, which are identical with those employed in the first embodiment.

Detecting electrodes 4 of three phases se-a, se-b and se-c are connected selectively to either a driving voltage generator 9 or to buffer amplifiers 10 by switches SW-1, SW-2 and SW-3, respectively. Shielding electrodes 3 (sh-a, sh-b and sh-c) are connected selectively either to ground or to the driving voltage generator 9 by switches SW4, SW5 and SW6, respectively. The respective output terminals of the buffer amplifiers 10 are connected to the respective input terminals of A/D converters 13, respectively.

Digital signals obtained by converting the voltages of the detecting electrodes 4 are applied to a digital signal processor (DSP) 14, and then the DSP 14 processes the digital signals and gives instruction signals to the driving voltage generator 9 and the ion source 7.

The operation of the recharging system will be described hereinafter with reference to FIGS. 16(A) through 17(B).

Figure 16A:
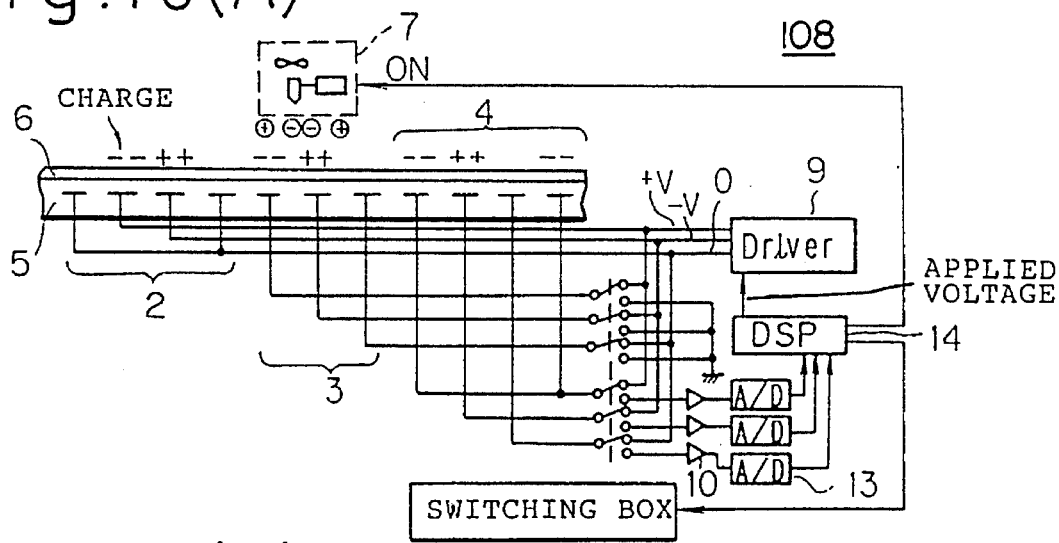
FIGS. 16(A), 16(B) and 16(C) are block diagrams and a graph for assistance in explaining a procedure of driving the electrostatic actuator of the fifth embodiment.

First, all the electrodes 2, 3 and 4 are connected to the driving voltage generator 9, thereby to apply voltages to the driving electrodes 2, the shielding electrodes 3 and the detecting electrodes 4 in a predetermined voltage pattern and the ion source 7 is started. Then, charges are settled in sections of the second member 6 as shown in FIG. 16(A).

Figure 16B:
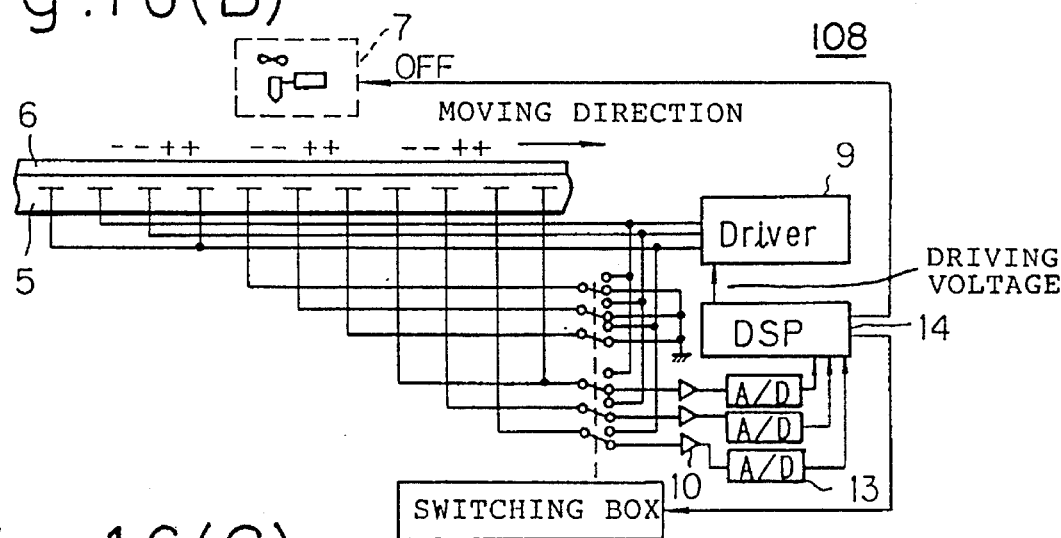
Figure 16C:
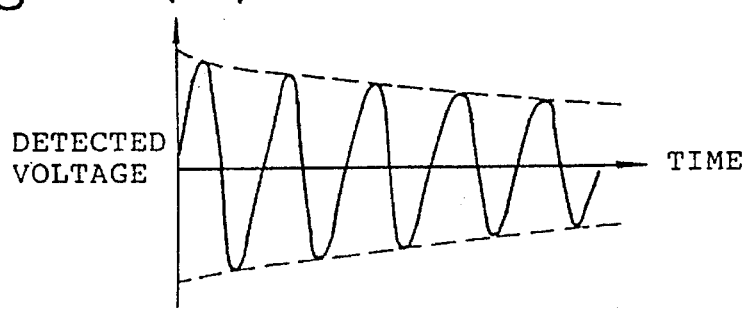

After charges have settled in the sections of the second member 6, the shielding electrodes 3 are grounded, the detecting electrodes 4 are connected to a detecting unit and the voltages applied to the driving electrodes 2 consecutively to drive the electrostatic actuator (FIG. 16(B)). As the second member 6 is moved, a potential as shown in FIG. 16(C) is induced in the detecting electrodes 4. The amplitude of the potential is dependent on the quantity of charges settled on the second member 6; the amplitude is larger when the quantity of settled charges is larger and vice versa.

Figure 17A:
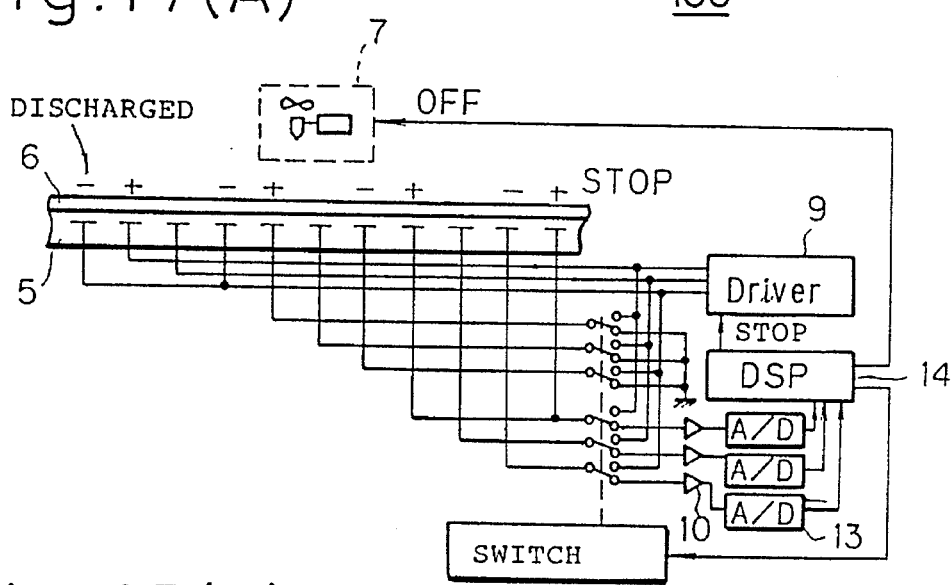
FIGS. 17(A) and 17(B) are block diagrams for assistance in explaining a procedure of driving the electrostatic actuator of the fifth embodiment.
Figure 17B:
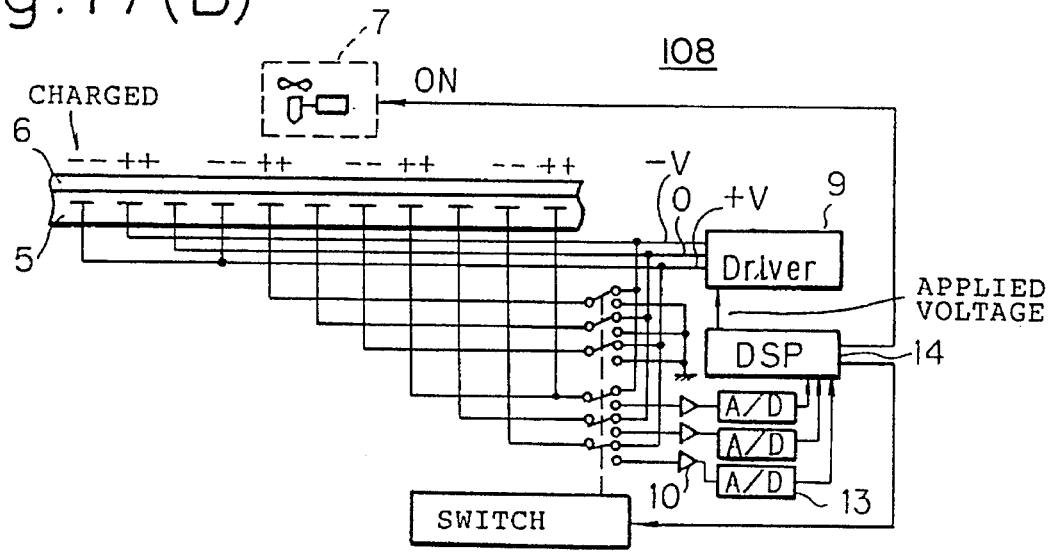

While the electrostatic actuator is driven for an extended period of time, the charges on the second member 6 decrease gradually and, consequently, the amplitude of the potential of the detecting electrodes 4 is decreased accordingly. The DSP 14 monitors the amplitude of the potential of the detecting electrodes 4 and stops the driving operation of the electrostatic actuator so that the second member 6 is stopped so as to have the charged sections of the second member arrive at a position exactly above the electrodes as shown in FIG. 17(A), when the amplitude has decreased excessively. After the second member 6 has stopped, all the electrodes are connected to the driving voltage generator 9, a negative voltage is applied to the electrodes underlying the +-sections, a positive voltage is applied to the electrodes underlying the ―-sections, 0 volt is applied to the electrodes underlying the 0-sections, and the ion source 7 is started (FIG. 17(B)). Thus, the charged sections of the second member 6 are recharged, thereby to replenish the charged sections with charges. Then, the steps of the operation illustrated in FIG. 16(B) through 17(B) are repeated.

In the electrostatic actuator of the present invention, the position of the second member 6 and the quantity of charges on the second member 6 can be readily detected. The method of controlling the electrostatic actuator in accordance with the present invention thus is able to drive the electrostatic actuator efficiently.

We claim:

1. An electrostatic actuator comprising:

a first member having a first surface;

a plurality of driving electrodes insulated from each other and disposed on the first surface of the first member, each driving electrode having a strip shape and the plurality of driving electrodes being disposed at positions spaced at predetermined intervals along a predetermined direction, on the first surface;

a second member placed on, and in contact with, the first surface of the first member, the first and second members being relatively moveable to successive, different relative positions therebetween;

control means for applying a first pattern of voltages of plural, different voltage levels to respective, different driving electrodes of the plurality of driving electrodes and thereby inducing a first pattern of plural, different charges in portions of the second member corresponding to the positions of the plurality of driving electrodes on the first member at a first relative position of the first and second members, the first pattern of charges producing first electric fields relative to the strip shape electrodes of the first member and corresponding attractive forces which attract the second member to the first member and produce a frictional force therebetween, the control means applying, alternatively in the first relative position of the first and second members, a second and different pattern of voltages of plural, different voltage levels to respective, different driving electrodes of the plurality of driving electrodes thereby temporarily producing second electric fields and corresponding repulsive and transverse forces which temporarily reduce the frictional force between the first and second members and move the first member relatively to the second member to a second, and different, successive relative position therebetween, the second pattern of plural different voltage levels establishing a corresponding second pattern of plural, different charges in the corresponding portions of the second member;

at least one detecting electrode disposed at a specified phase-related position with respect to the predetermined intervals of the plurality of driving electrodes on the first surface of the first member, the patterns of charges induced on the second member producing a corresponding electrical signal in each detecting electrode, in accordance with the specified phase-related position thereof; and detecting means for detecting the position of the second member relative to the first member through the detection of the electric signals produced in each detecting electrode, the control means responding to the different electric signals for changing the pattern of voltages applied thereby to the driving electrodes in phased relationship to the relative movement of the first and second members to each next successive relative position.

2. An electrostatic actuator according to claim 1, further comprising a plurality of detecting electrodes disposed at spaced intervals on the first surface of the first member in a common phase with each other and electrically interconnected.

3. An electrostatic actuator according to claim 2, further comprising a plurality of detecting electrodes disposed on the first surface of the first member, insulated from each other and disposed in a plurality of groups, each group comprising plural, different detecting electrodes and the plural, different detecting electrodes of each group having respective, different phases.

4. An electrostatic actuator according to claim 1, wherein at least one shielding electrode is disposed between the driving electrodes and the detecting electrodes.

5. An electrostatic actuator according to claim 2, wherein:

the plurality of driving electrodes are insulated from each other and arranged in a plurality of groups, each group comprising a plurality of different driving electrodes and the plural, different driving electrodes of each group thereof having respective, different phases;

the number of different phases of the plural, different detecting electrodes of each group is equal to the number of different phases of the plural, different driving electrodes; and the detecting electrodes are spaced by intervals which are equal to the spacing intervals of the driving electrodes.

6. An electrostatic actuator according to claim 2, wherein the detecting electrodes are arranged at positions having the same phase as those of a group of the driving electrodes.

7. A method of controlling an electrostatic actuator which comprises a first member having a first surface on which are provided a plurality of driving electrodes, each having the shape of a strip, insulated from each other and arranged at predetermined intervals along a predetermined direction and a second member having a second surface in contact with the first surface of the first member and having a friction of force therebetween, the method comprising:

changing a pattern of voltages applied to the plurality of driving electrodes thereby to reduce, temporarily, the friction of force acting between the first and second members by electrostatic repulsion and to move one of the first member and the second member relatively to the other member by the attraction of the adjacent electrodes;

detecting the potential of an electric signal induced in at least one detecting electrode, disposed on the first member in a predetermined phase independently of the driving electrodes of the first member, by charges distributed on the second member thereby to detect the state of the electrostatic actuator; and controlling the electrostatic actuator according to the detected state thereof.

8. A method of controlling an electrostatic actuator according to claim 7, further comprising:

detecting the potentials of a plurality of electrical signals induced in a corresponding plurality of detecting electrodes disposed on the first member; and controlling the timing of the changing of the pattern of voltages applied to the driving electrodes by processing the respective electric signal potentials, of the plurality of detecting electrodes, and data representing a history of the electrostatic actuator.

9. A method of controlling an electrostatic actuator according to claim 7, further comprising changing the pattern of the voltages applied to the driving electrodes when the potential of the detecting electrode crosses zero in a predetermined direction while the electrostatic actuator is being driven.

10. A method of controlling an electrostatic actuator according to claim 7, further comprising changing the pattern of the voltages applied to the driving electrodes when the potential of the detecting electrode reaches one of a maximum and a minimum while the electrostatic actuator is being driven.

11. A method of controlling an electrostatic actuator according to claim 7, further comprising distributing further charges on the second member when an amplitude of variation of the detecting electrode potential decreases below a predetermined level.

12. An electrostatic actuator, comprising:

a first member having a first surface;

a plurality of driving electrodes insulated from each other and disposed on the first surface of the first member, each of said driving electrodes having a strip shape and said plurality of driving electrodes being disposed at positions spaced at predetermined intervals along a predetermined direction, on the first surface of said first member;

a second member placed over the first surface of the first member, the first and second members being relatively movable to successive, different relative positions therebetween;

control means for controlling voltages applied to said plurality of driving electrodes to create a charge pattern on said second member so that said second member is moved relatively to said first member due to the charge pattern on said second member;

at least one detecting electrode, provided on said first member, for detecting the charge pattern on said second member and for producing a detection voltage which is induced by the charge pattern, the relative positions between the charge pattern on said second member and said detecting electrode on said first member being varied; and a detector, responsive to the detection voltage produced by said detecting electrode, for detecting a position of said second member.

13. An electrostatic actuator according to claim 12, further comprising a plurality of detecting electrodes disposed at spaced intervals on the first surface of the first member in a common phase with each other and electrically interconnected.

14. An electrostatic actuator according to claim 13, further comprising a plurality of detecting electrodes disposed on the first surface of the first member, insulated from each other and disposed in a plurality of groups, each group comprising plural, different detecting electrodes and the plural, different detecting electrodes of each group having respective, different phases.

15. An electrostatic actuator according to claim 12, wherein at least one shielding electrode is disposed between the driving electrodes and the detecting electrodes.

16. An electrostatic actuator according to claim 13, wherein:

the plurality of driving electrodes are insulated from each other and arranged in a plurality of groups, each group comprising a plurality of different driving electrodes and the plural, different driving electrodes of each group thereof having respective, different phases;

the number of different phases of the plural, different detecting electrodes of each group is equal to the number of different phases of the plural, different driving electrodes; and the detecting electrodes are spaced by intervals which are equal to the spacing intervals of the driving electrodes.

17. An electrostatic actuator according to claim 13, wherein the detecting electrodes are arranged at positions having the same phase as those of a group of the driving electrodes.

\* \* \* \* \*

UNITED STATES PATENT AND TRADEMARK OFFICE
CERTIFICATE OF CORRECTION

PATENT NO: 5,534,740
DATED    : July 9, 1996
INVENTOR(S):Toshiro Higuchi

It is certified that error appears in the above-identified patent and that said Letters Patent is hereby corrected as shown below:

Title page, item [75], first inventor's address should be deleted.

Signed and Sealed this

Twenty-fifth Day of March, 1997

*Attest:*

BRUCE LEHMAN

*Attesting Officer*            *Commissioner of Patents and Trademarks*